United States Patent [19]

King, Sr.

[11] 4,270,565

[45] Jun. 2, 1981

[54] INLINE DISPERSAL VALVE

[76] Inventor: Lloyd H. King, Sr., 311 Blake Rd., Hopkins, Minn. 55343

[21] Appl. No.: 42,762

[22] Filed: May 29, 1979

Related U.S. Application Data

[63] Continuation-in-part of Ser. No. 958,167, Nov. 6, 1978.

[51] Int. Cl.³ ............................................. B01F 1/00
[52] U.S. Cl. .................................. 137/268; 422/263; 422/277
[58] Field of Search ............... 137/268; 422/263, 264, 422/282, 276, 277; 239/310

[56] References Cited

U.S. PATENT DOCUMENTS

| | | | |
|---|---|---|---|
| 3,618,539 | 11/1971 | Daniels | 137/268 X |
| 3,846,078 | 11/1974 | Brett | 137/268 X |
| 3,901,262 | 8/1975 | Gutkowski | 137/268 X |

*Primary Examiner*—Alan Cohan
*Attorney, Agent, or Firm*—Jacobson and Johnson

[57] ABSTRACT

An apparatus for controllably dispersing material into a fluid stream with the apparatus having a housing with a bottom section that attaches to a pipe line and a top section having a recess for a porous container to support a solid fluid soluble material. The porous container can be controllably inserted into a fluid stream through coaction of a spring and cap to control the amount of soluble material entering the fluid stream. A lower seal on the porous container prevents fluid from escaping from the line when the porous container is in the up position and an upper seal prevents leakage past the cap when the valve is in operation and a pair of cam action retractable stops that permit the porous container to be secured to or releasably mounted in the housing.

3 Claims, 6 Drawing Figures

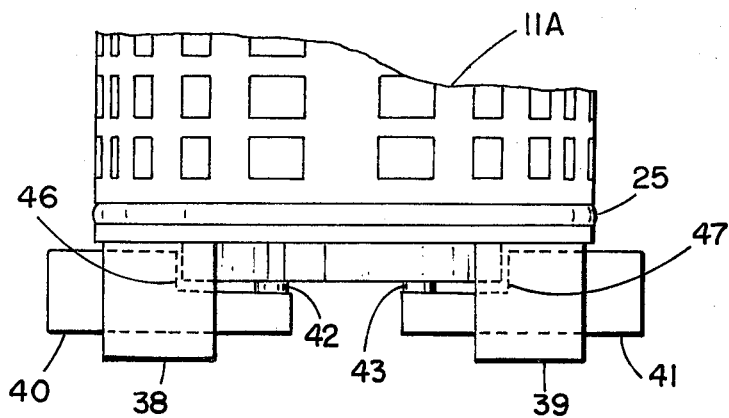
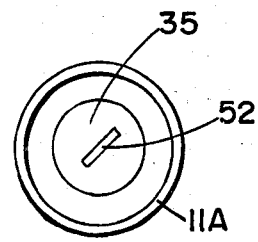
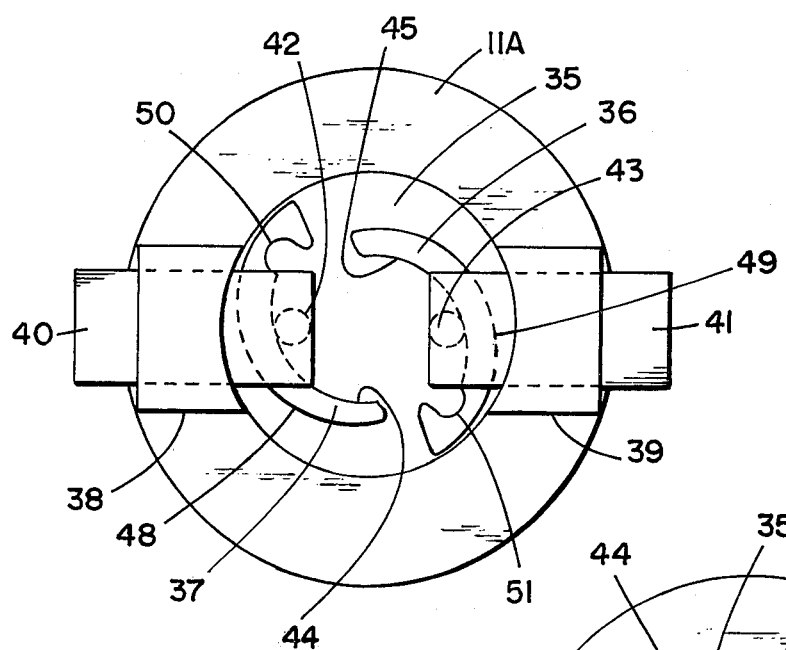
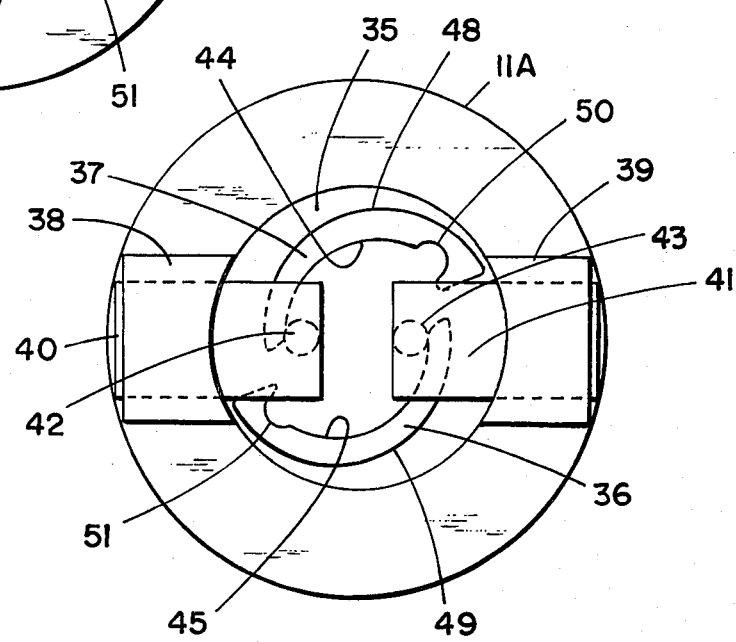

INLINE DISPERSAL VALVE

CROSS REFERENCE TO RELATED APPLICATIONS

This application is a continuation-in-part of my co-pending application titled INLINE DISPERSAL VALVE, U.S. Ser. No. 958,167, filed Nov. 6, 1978.

BACKGROUND OF THE INVENTION

1. Field of the Invention

This invention relates generally to attachments for fluid pipe lines and, more specifically, to attachments for controllably dispersing fluid soluble materials into a fluid stream.

2. Description of the Prior Art

The concept of dissolving solid material and controllably releasing the material into a fluid stream such as with the bromination of swimming pools is accomplished by suspending a fluid soluble solid in the fluid stream. The present invention provides an improvement to prior art systems to allow a user to control the amount of material dispersed into the fluid stream.

SUMMARY OF THE INVENTION

Briefly, the present invention comprises an inline dispersal valve having a porous container for holding a solid. The porous container can be controllably lowered into the fluid stream. The porous container has a sealing means on one end to seal the porous container from the fluid stream when the solid is inserted into the porous container. A second sealing means on the housing prevents leakage of fluid from the inline dispersal valve when the valve is in operation. A retractable stop permits one to securely mount the porous container in the housing or to quickly remove the porous container from the housing.

BRIEF DESCRIPTION OF THE DRAWING

FIG. 3 is a side view of the retractable stops in my inline dispersal valve;

FIG. 4 is a bottom view of my inline dispenser showing retractable stops in an extended position;

FIG. 5 is a bottom view of my inline dispenser showing the retractable stops in a retracted position; and FIG. 6 is a top view of my inline dispenser showing the mechanism for actuating the retractable stops.

DESCRIPTION OF THE PREFERRED EMBODIMENT

Figure 1:
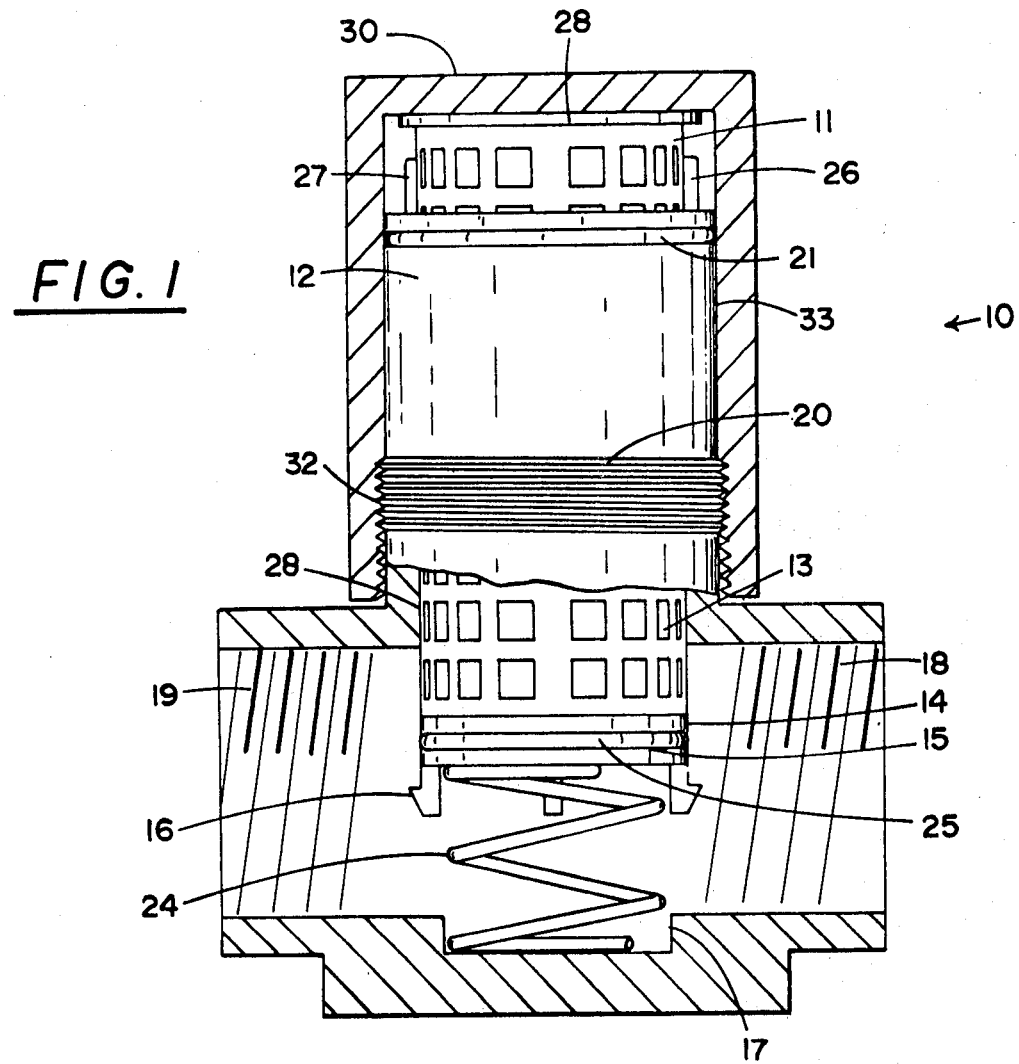
FIG. 1 is a partial sectional view of my inline dispersal valve.

Referring to FIG. 1, reference numeral 10 generally designates my inline dispersal valve comprising a T shaped housing 12, a porous container 11, and a cap 30. Housing 12 has a threaded insert 18 located on one end and a threaded insert 19 located on the other end for attachment of housing 12 to a fluid line. Slideably mounted within a cylindrical opening in housing 12 is a cylindrical porous container 11. Container 11 has a series of openings 13 therein which allow fluid to flow therethrough. The lower portion of container 11 contains a solid bottom 14 having a groove 15 with an O ring 25 therein.

Attached to the underside of container 12 are a set of one way catches 16 for retaining container 11 in housing 12 when cap 30 is removed. Located partially in recess 17 is a compression spring 24 that extends into pressure contact with the bottom of container 11. Spring 24 provides an upward force on container 11 causing the container top 28 to be held in pressure contact with the top inside surface of cap 30. Unscrewing cap 30 allows spring 24 to force container 11 upward. If cap 30 is unscrewed completely, container 11 rises until catches 16 engage the inside of housing 10 thereby preventing spring 24 or the fluid pressure from forcing container 11 out of housing 12. This position is defined as the up condition. Spring 24 insures that container 11 always returns to the up condition when cap 30 is removed thereby preventing injury to anyone removing cap 30 when the fluid line is under pressure. With container 11 in the up condition, O ring 25 seats against the interior cylindrical sealing surface 28 in housing 11 thereby preventing fluid from the line entering container 11 when the cap 30 is removed. Sealing the fluid line from container 11 eliminates the necessity of the user shutting off the pressure in the fluid line when cap 30 is removed. With cap 30 removed, the user can insert a new solid into container 11. Thus an advantage of the present invention is the ease in which a solid can be added to container as well as eliminating the need to shut off the fluid line when solids are added to container 11.

After insertion of the solid material in container 11, the user screws the threads 32 on cap 30 onto the threads 20 on housing 10. Besides thread section 20, the interior of cap 30 has a smooth cylindrical surface 33 located above the threaded section 20 which forms a sealing surface for engagement with O ring 21.

Screwing cap 30 onto housing 10 forces container 11 downward into the fluid stream. To prevent rotation of container 11 during rotation of cap 30, a pair of guides 26 and 27 located on basket 11 slideably follow a vertical groove located in the interior of housing 10. As container 11 is lowered fluid enters the lower openings in container 11. To prevent fluid in container 13 from leaking past the cap, O ring seal 21 on housing 11 coacts with smooth cylindrical surface 33 to prevent leakage between cap 30 and housing 10.

Figure 2:
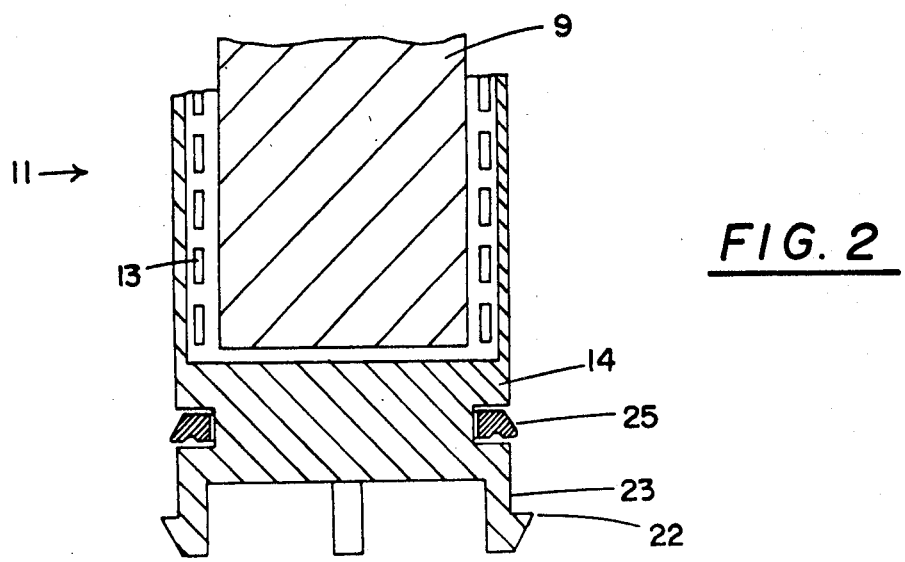
FIG. 2 is an enlarged view of the sealing means on the bottom of the porous container of my inline dispersal valve.

Referring to FIG. 2, there is shown an enlarged sectioned view of container 11 with the bottom container 11 having a solid material 9 located therein. In operation fluid flows through openings 13 and around the solid thereby slowly dissolving and dispersing the solid material into the fluid stream.

One can control the amount of fluid flowing through container 11 by lowering or raising container 11. Lowering or raising container 11 controls the concentration of solid material dissolved and dispersed in the fluid stream, i.e. the more fluid flowing through container 11, the greater concentration of dissolved solid in the stream.

Instead of an O ring seal, container 11 has a one way seal 25 which has an outward projecting lip to thereby prevent fluid from seaping past the basket when the basket is in the up condition. Tabs or catches 16 are shown in more detail to comprise a lip 22 attached to a semiflexible neck 23. The lip 22 has a slanted face for ease of insertion in housing 10. Flexible neck 23 allows the catches to bend inward during the assembly process. After assembly, lips 22 engage the inside of housing 10 to prevent container 11 from being forced out of container 11.

Another feature of the present invention is that spring 24 allows container 11 to slide downward into the fluid stream should the gas pressure in the cap 30 and container 11 exceed a certain value. For example, if one places chlorine in container 11 and places cap 30 on the housing without turning cap 30 down sufficiently far to lower container 11 into the fluid stream, the gas generated by the chlorine could increase causing rupture of the cap 30 if container 11 were locked in position. However, spring 24 allows container 11 to slide downward allowing gas to enter the fluid stream even though cap 30 is not down sufficiently far as to displace container 11 into the fluid stream.

In operation, thread 32 and thread 20 engage before top 28 of container 11 engages the inside of cap 30. Thus insuring that no fluid will escape through container 11 during installation of cap 30.

Preferably, valve 10 is made from a polymer plastic; however, metals are also suitable for use in manufacture of my valve.

Referring to FIG. 3, reference numeral 40 and 41 designate an alternate pair of retractable stops for use in my invention. Retractable stops 40 and 41 can be used in lieu of catches 16 which are difficult to remove from an inline system without disassembling the inline system. Retractable stop 40 is slideably mounted within a U shaped housing 38 which is attached to the bottom of container 11A. Similarly, stop 41 is slideably mounted within a U shaped housing 39 which is also attached to housing **11*a*. Slideable stop 40 includes a first cylindrical cam follower 42 and a second cam follower surface 46. Similarly, stop 41 includes a first cylindrical cam follower 43 and a second cam follower surface 47. Referring to FIGS. 3, 4, and 5, the operation and configuration of slideable stops 40 and 41 and the cam surface that coact with the cam follower surfaces will become apparent. FIG. 4 shows retractable stops 40 and 41 in a partially extended position. In the partial extended position a first crescent shaped cam 36 which is mounted on a rotatable member 35 is located in contact with cam follower 43. Similarly, a second crescent shaped cam 37 is located on the opposite side of rotatable member 35. Cam 36 has a first cam surface 45 for coacting with cam follower 43 and a second cam surface 49 for coacting with cam follower 47. Cam surface 45 includes a locking surface or indent 51. Similarly, cam 37 includes a first cam surface 44 for coacting with cam follower 42 and a second cam surface 48 for coacting with cam follower 46. Cam 37 also includes a locking surface or indent 50**.

In order to understand the operation of the cam it should be noted that rotatable member 35 and cams 37 and 36 are made from a single piece of material such as a polymer plastic. Similarly, other portions such as housing 11A and the retractable stops can also be made of a polymer plastic material. Rotatable member 45 is rotatably mounted and sealed with an O ring seal or the like (not shown) in the bottom of container 11A. FIG. 6 shows a top view of rotatable member 35 located in the bottom of container 11A. Note, rotatable member 35 has a screwdriver slot 52 on the top side. On the bottom side of rotatable member 35 are cams 36 and 37. The placement of a screwdriver slot 52 in rotatable member 35 permits one to rotate member 35 and the cam 36 and 37 from the top of container 11A.

Referring to FIGS. 4 and 5, rotation of stop 45 in a counterclockwise direction extends stops 40 and 41 outward. Continued rotation of member 35 causes cam followers 43 and 42 to lock into recesses 51 and 50, i.e. cam surface 49 bears against cam follower 47 and cam surface 48 bears against cam follower 46 to force stops 40 and 41 into the extended position. When locked in recess, stops 41 and 40 cannot be accidentally retracted. That is, a sizeable torque must be applied to rotate member 35 in the opposite direction before one can force retractable stops 40 and 41 inward. In order to retract stops 40 and 41, one rotates rotatable member clockwise (FIG. 5) causing cam surfaces 44 and 45 to retract stops 41 and 40 into the conditions shown in FIG. 5. In the retracted position, it will be noted that the end of stops 40 and 41 are inside the outer dimensions of porous container **11*a*. In this position, porous container 11A can be inserted or removed from the inline system. It will be appreciated that when the container is inserted into the inline system and the stops are extended, one cannot accidentally remove porous container 11A from container 11. Thus, the retractable stops provide a means for inserting or removing container 11A** from a system without the necessity of disassembling the system.

I claim:

1. An inline dispersal valve for controllably releasing material into a fluid line comprising:

- a housing having a means for attachment to a pressurized fluid line, said housing having an opening therein operable for fluid coupling with fluid in a fluid line;
- a porous container slidably mounted in opening in said housing;
- means for controllably raising or lowering said container into the pressurized fluid line to allow fluid to flow through said container to thereby dissolve soluble solid in said container and transport said dissolved material into the fluid stream;
- a retractable stop operable for inward and outward motion, said retractable stop operable for holding said container in said housing and for retraction to permit release of said container from said housing;
- a rotatable member for actuating said retractable stop; and
- resilient means for maintaining said container in contact with said means for controllably raising or lowering said container.

2. The invention of claim 1 wherein said rotatable member includes a cam surface and said retractable stop includes a cam follower surface so that rotation of said rotatable member in a first direction produces an outward motion of said retractable stop and rotation of said rotatable member in an opposite direction produces inward motion of said retractable stop.

3. The invention of claim 3 wherein said cam members include a locking surface for locking said retractable stop in an outward position.

* * * * *